United States Patent [19]

Smith

[11] Patent Number: 5,664,919
[45] Date of Patent: Sep. 9, 1997

[54] NON-BLIND RIVET

[75] Inventor: Daniel Robin Smith, Castle Bromwich, United Kingdom

[73] Assignee: Emhart Inc., Newark, Del.

[21] Appl. No.: 629,722

[22] Filed: Apr. 9, 1996

[30] Foreign Application Priority Data

Apr. 11, 1995 [GB] United Kingdom ............... 9507372

[51] Int. Cl.$^6$ ...................................................... A47G 9/00
[52] U.S. Cl. ........................................... 411/34; 411/501
[58] Field of Search ............................. 44/34, 38, 55, 44/501, 915

[56] References Cited

U.S. PATENT DOCUMENTS

| | | | |
|---|---|---|---|
| 2,466,811 | 4/1949 | Huck | 411/34 |
| 2,767,877 | 10/1956 | Newsom | 411/501 |
| 3,365,998 | 1/1968 | Zahodiakin et al. | |
| 4,363,580 | 12/1982 | Bell | 411/501 |
| 4,499,647 | 2/1985 | Sakamura et al. | |
| 4,907,922 | 3/1990 | Jeal | 411/34 |
| 5,263,247 | 11/1993 | Adachi et al. | |

FOREIGN PATENT DOCUMENTS

| | | | |
|---|---|---|---|
| 0077858 | 5/1983 | European Pat. Off. | |
| 0158305 | 10/1985 | European Pat. Off. | |
| 1500856 | 8/1969 | Germany | |
| 3240539 | 11/1983 | Germany | |
| 445204 | 2/1968 | Switzerland | 411/34 |
| 605182 | 7/1948 | United Kingdom | |
| 646298 | 11/1950 | United Kingdom | 411/34 |
| 0977377 | 12/1964 | United Kingdom | |
| 1244034 | 8/1971 | United Kingdom | |

Primary Examiner—Flemming Saether
Attorney, Agent, or Firm—E. D. Murphy

[57] ABSTRACT

A non-blind rivet is disclosed that can be used to form a joint without the need for brazing, welding or threaded locknuts. The rivet 1 is placed in compression by opposing dies 15,20 causing a narrow region of the rivet wall to buckle forming a fold 24, the rivet thus being held to a workpiece 12 between a flange 6 and the fold 24.

11 Claims, 5 Drawing Sheets

1
NON-BLIND RIVET

BACKGROUND OF THE INVENTION

This invention is concerned with non-blind rivets and in particular with non-blind rivets formed with axial bores.

Non-blind rivets, that is to say rivets which can only be set provided there is access to both sides of a workpiece to which the rivets are to be secured, have been suggested in many different configurations and for many different purposes.

It is sometimes required, for example in the manufacture of vehicles, to secure a small tube to a workpiece, for example to provide a drainage hole.

Such tubes are often connected to primary workpieces, such as, for example, sun roofs, fuel tanks and so forth by methods such as brazing, welding, or by the use of threaded locknuts. Such known methods of connection tend to be labour intensive and are accordingly expensive.

SUMMARY OF THE INVENTION

According to a first aspect of the invention a non-blind rivet, adapted to be set by compressive forces, comprises a rivet body having a tubular wall surrounding an axial bore which extends from a tail end portion to a head end portion of the rivet. A head flange at the head end portion of the rivet extends outward from the body. The non-blind rivet is characterized in that the axial bore includes two portions of different diameters with a first portion having a first diameter and extending from the tail end portion, and a second portion having a second diameter greater than the first diameter and extending from the head end portion of the bore.

Preferably, the axial bore comprises third portion, having a third diameter less than that of the first portion, the third portion extending between the first portion of the rivet and the second portion thereof.

BRIEF DESCRIPTION OF THE DRAWINGS

The invention will now be described, by way of example only, with reference to the accompanying drawings, in which.

DETAILED DESCRIPTION OF THE PREFERRED EMBODIMENT

Figure 1:
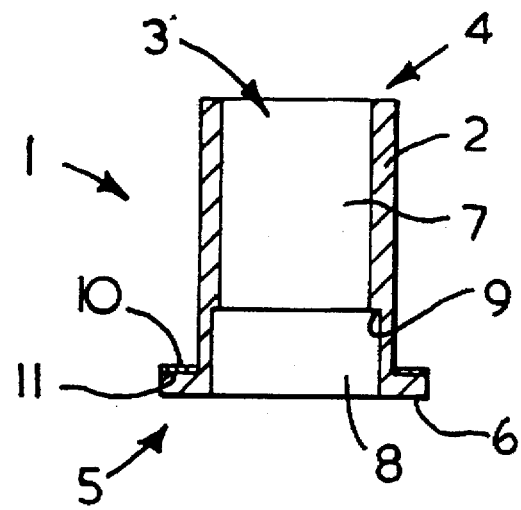
FIG. 1 shows a rivet according to a first aspect of the invention.

Referring to FIG. 1, a rivet 1 according to the first aspect of the invention is shown. The rivet comprises a tubular wall 2 surrounding an axial bore 3 which extends from a tail end region 4 to a head end region 5 of the tubular wall. The head end portion is provided with a head flange 6 extending outwardly from the tubular wall.

The axial bore 3 comprises two portions of different diameter. A first portion 7 of lesser diameter extends from the tail end portion to the head end portion of the rivet. A second portion 8 of greater diameter extends from the head end region towards the tail end portion. The first and second portions of the bore meet at a step 9.

Figure 2:
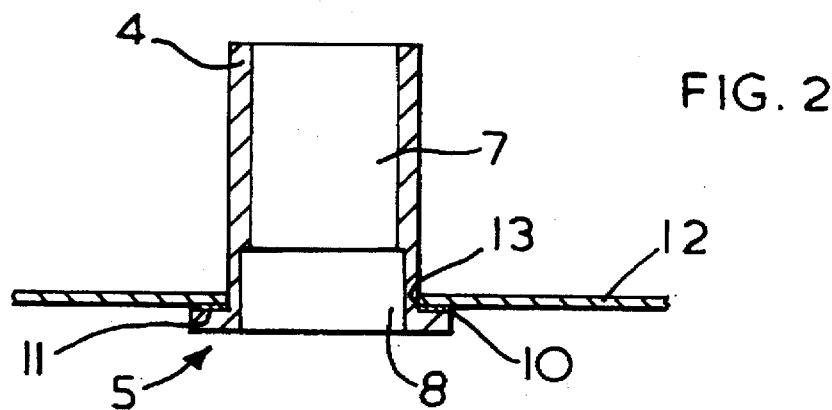
FIG. 2 shows the rivet of FIG. 1 in a hole in a workpiece.

Turning to FIG. 2, the rivet 1 can be seen in position in a hole 13 in a workpiece 12. The flange 6 presents an abutment surface 11 to the workpiece 12. Since the joint between the rivet and the workpiece is intended to be watertight, the abutment surface 11 is preferably coated with a sealant 10, such as a polymer.

Figure 3:
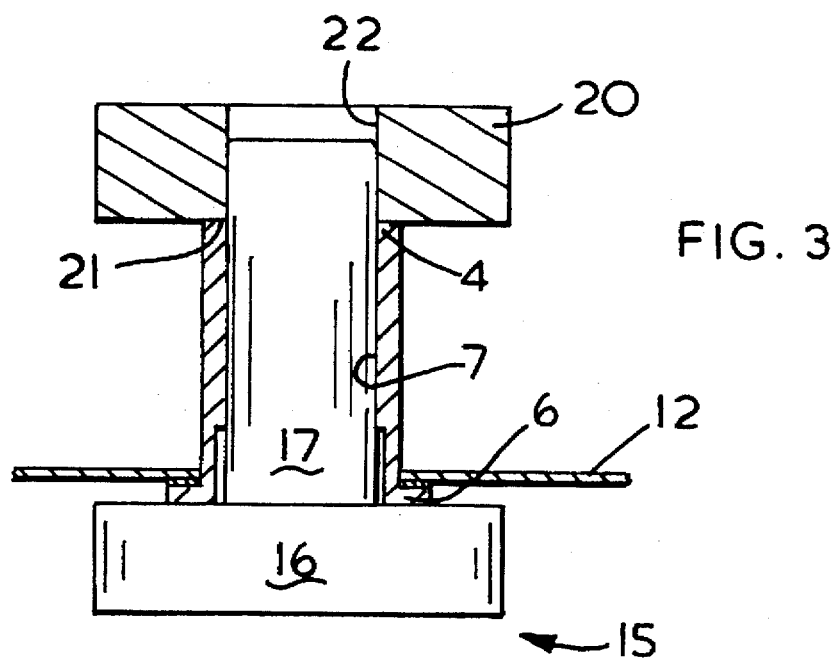
FIG. 3 shows the rivet of FIG. 1, the workpiece and first and second dies.

In FIG. 3, the assembly of FIG. 2 is shown together with dies 15,20 that will cause the rivet 1 to deform. A first die 15, comprises a base 16 and a projection 17. The projection 17 has similar external dimensions to the first portion 7 of the axial bore and pauses therethrough, such that the base 16 of the die is in contact with the flange 6. The projection also passes into a bore 22 in a second die 20. The bore 22 in the second die has similar dimensions to the second portion 7 of the axial bore. The second die 20 also comprises an abutment surface 21 which rests on the tail end portion 4 of the rivet.

Figure 4:
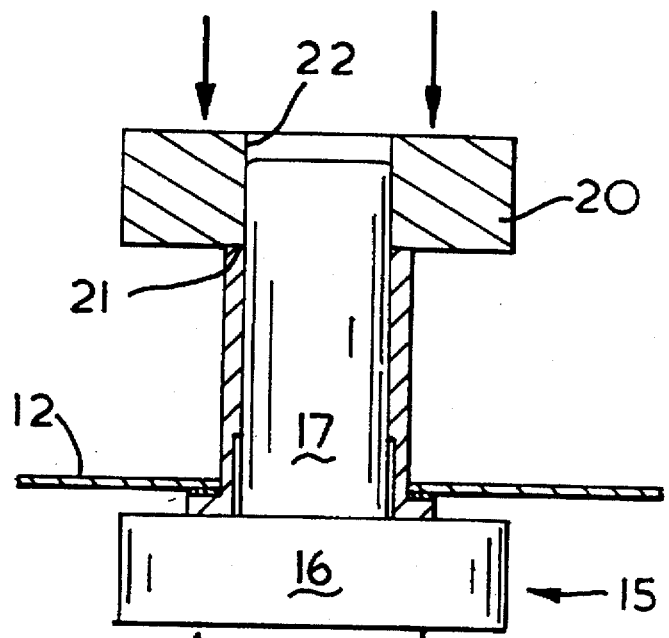
FIG. 4 shows a view similar to that of FIG. 3.

Once in position, the dies are moved together relative to one another, as indicated by the arrows in FIG. 4.

Figure 5:
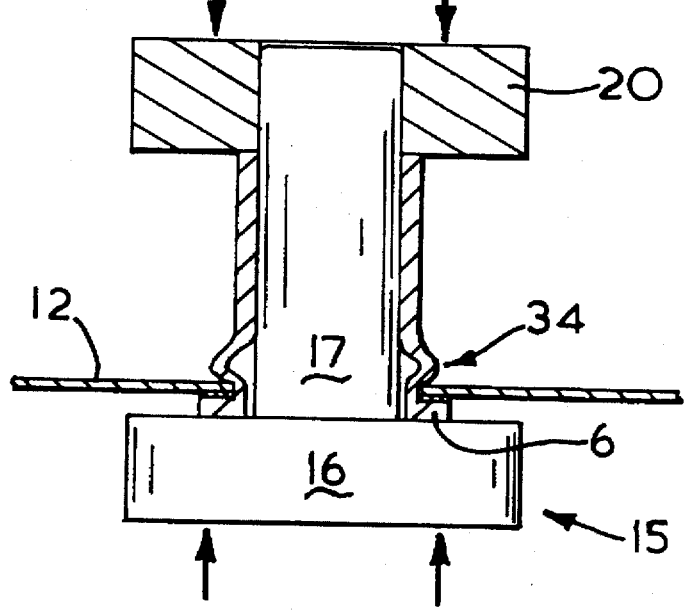
FIG. 5 shows the rivet being set.

The compression forces acting on the tubular wall 2 cause the wall to collapse in the region of the second portion of the axial bore forming a fold 24, trapping the workpiece 12 between the fold 24 and the flange 6 (FIG. 5).

Figure 6:
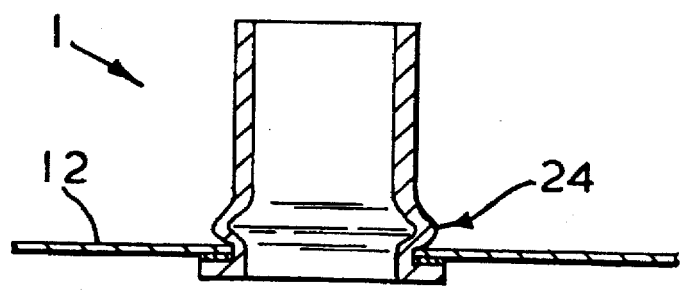
FIG. 6 shows the set rivet.

Such a rivet set in this way is shown in FIG. 6. The extent of the deformation bulge 24 is preferably limited by means (not shown) restricting the distance that the dies 15,20 can move toward one another. This will prevent oversetting of the rivet.

Figure 7:
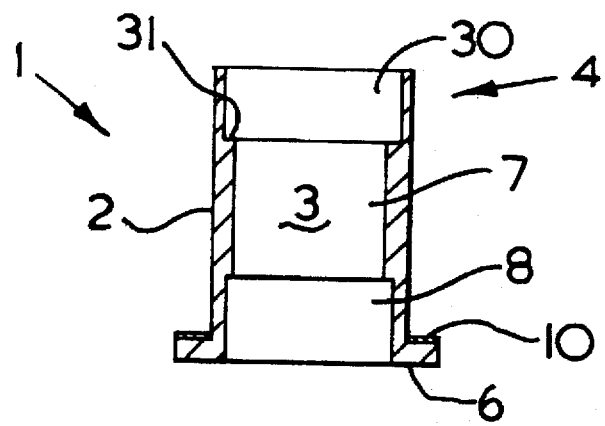
FIG. 7 shows a modified rivet.

In an alternative embodiment, shown in FIG. 7, the tubular wall 2 of the rivet 1 may be provided with a third portion 30 of diameter greater than that of the second portion 8. The third portion 30 extends from the tail end portion 4 of the bore, to join the first portion 7 at a step 31, the first portion now forming an intermediate part of the axial bore 3.

Figure 8:
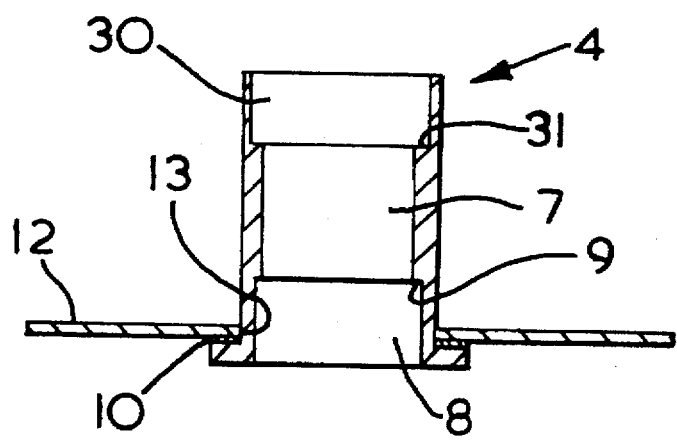
FIG. 8 shows the rivet of FIG. 7 in a hole in a workpiece.

FIG. 8 shows the modified rivet in position in a hole 13 in a workpiece 12.

Figure 9:
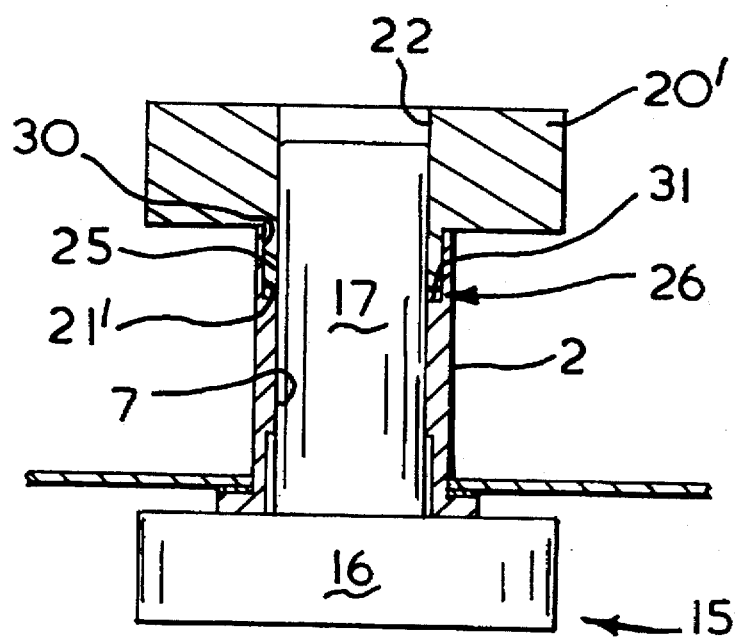
FIG. 9 shows the rivet of FIG. 7, the workpiece and first and second dies.

In setting such a modified rivet, a modified second die 20' is used (FIG. 9). The die 20' is again provided with a base 22 through which the projection of the first die extends, and has a similar diameter to that of the first region 7 of the axial bore 3. Whereas in the previous embodiment the abutment surface 21 was only in contact with an end surface of the tail end portion 4, the abutment surface 21' the present embodiment is in the form of a further projection or boss 25. The boss 25 has an external surface of similar dimensions to the diameter of the third portion 30 of the axial bore 3, and an internal diameter of similar dimensions to the first portion 7 of the axial bore. The boss 25 can thus extend between the tubular wall 2 in the region of the third portion 30 and the projection 17 of the first die 15. However, the boss 25 does not extend as far as the step 31 joining the first and third portions of the axial bore of the rivet, but leaves a gap 26, between the abutment surface 21' and the step 31.

Figure 10:
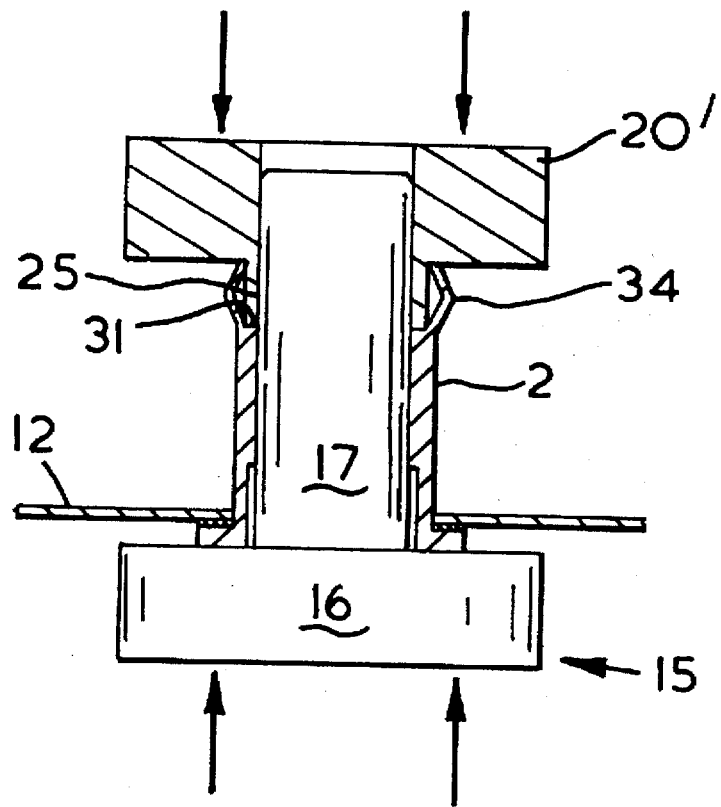
FIG. 10 shows a first stage in the setting of the rivet of FIG. 7.

When the dies are moved together relative to one another (FIG. 10), the tubular wall 2 in the region of the third portion of the axial bore is weakest and deforms first, to form an external ridge 34 in the rivet. The ridge will continue to form until the face 21' of the boss 25 abuts the step 31 in the tubular wall.

Figure 11:
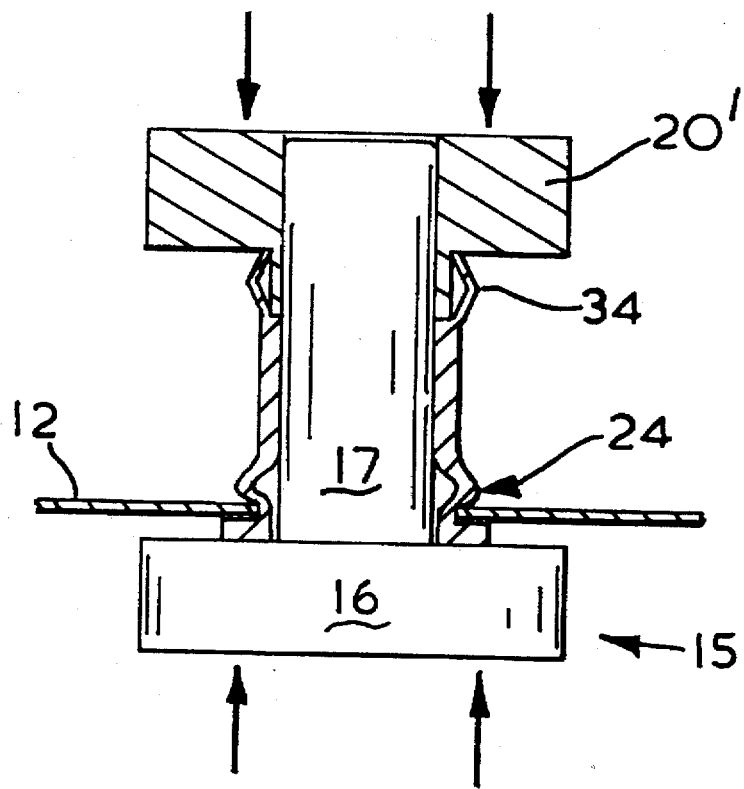
FIG. 11 shows a second stage in the setting of the rivet of FIG. 7.

Further relative movement of the dies will cause the tubular wall in the region of the second portion of the axial bore to deform, as described in the previous embodiment (FIG. 11), by virtue of compression forces from the die 20 being transmitted via the face 31 on wall 2.

Figure 12:
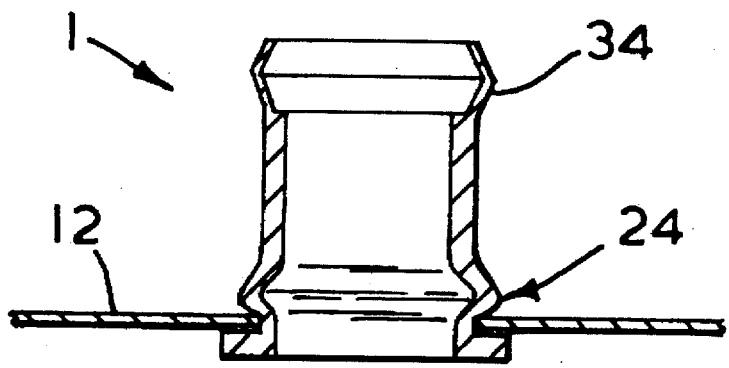
FIG. 12 shows the set rivet.
Figure 13:
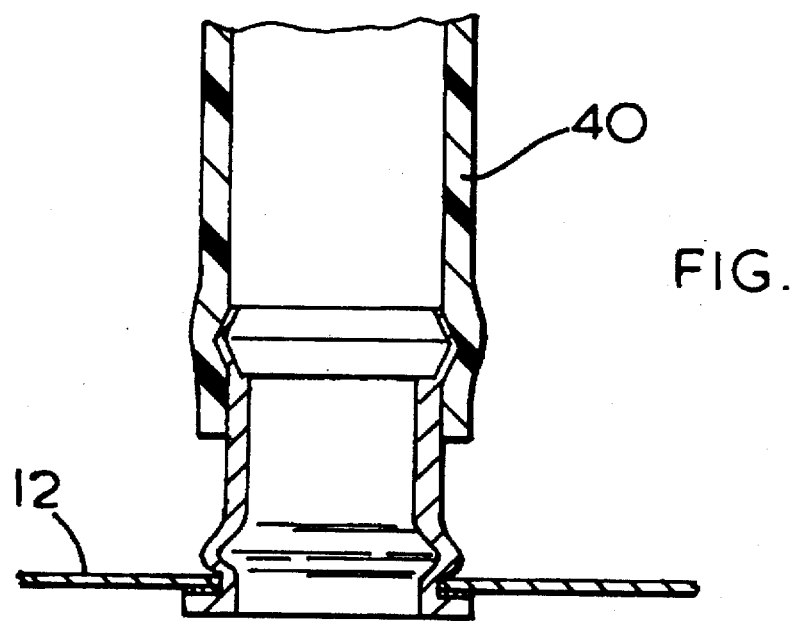
FIG. 13 shows the set rivet in use.

The fully set rivet is shown in FIG. 12. The ridge 34 may be used to attach a tube 40, or such like to the rivet, as shown in FIG. 13.

Figure 14:
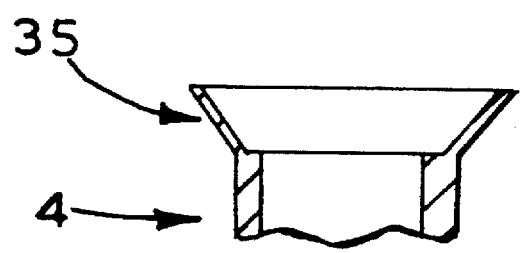
FIG. 14 shows a third embodiment of a tail end portion of a rivet in the set condition.

It will be understood that by varying the shape of the second die 20', and in particular the shape of the boss 25, a variety of shaped tail end portions can be formed, such as, for example, the flared flange 35 shown in FIG. 14.

I claim:

1. A non-blind rivet, adapted to be set by compressive forces, comprising a rivet body having a tubular wall around an axial bore which extends from a tail end portion to a head end portion of the rivet, a head flange at the head end portion of the rivet extending outwardly from the body, characterized in that the axial bore comprises:

three portions of different diameters;

a first cylindrical portion of the bore at a first diameter extending from the tail end portion;

a second cylindrical portion of the bore at a second diameter less than the first diameter extending from the head end portion;

an intermediate cylindrical portion of the bore extending between the first and second portions thereof at a diameter less than the second diameter;

a wall section formed in the tubular body adjacent the second portion of the bore and extending a prescribed axial distance; and the wall section having an axial length and a thickness sufficient to allow the wall section to buckle laterally upon the application of opposing axially inward pressure to the head end portion and the tail end portion.

2. A rivet according to claim 1 characterized in that the head flange is coated with a sealant.

3. The non-blind rivet as set forth in claim 1, which further comprises:

a surface formed at an inboard end of the second portion of the bore which is generally perpendicular with the axis of the bore and is located in a planar cross section of the tubular body which defines an inboard end of the wall section.

4. The non-blind rivet as set forth in claim 1, which further comprises:

the first portion of the bore extending a second prescribed axial distance sufficient to form a second wall section of the tubular body adjacent the first portion; and the second wall section having an axial length and a thickness sufficient to allow the second wall section to buckle laterally upon application of opposing axially inward pressure to the head end portion and the tail end portion.

5. The non-blind rivet as set forth in claim 4, which further comprises:

a surface formed at an inboard end of the first portion of the bore which is generally perpendicular with the axis of the bore and is located in a planar cross section of the tubular body which defines an inboard end of the second wall section.

6. The non-blind rivet as set forth in claim 4, wherein the wall thickness of the wall section adjacent the second portion is less than the second wall thickness.

7. A method of setting a rivet according to claim 1 comprising the steps of a. positioning the rivet in a hole in a workpiece, the head flange abutting the workpiece b. bringing a second die into contact with the tail of the rivet, the second die comprising an abutment surface for abutment with the tail of the rivet, and a through bore through which the projection of the first die may pass c. applying compressive forces to the rivet through the first and second dies to cause the tubular wall in the area of the second portion of the bore to collapse, trapping the workpiece between the head flange and collapsed wall.

8. A method of setting a rivet according to claim 7, characterized in that the second die comprises a boss extending between the projection of the first die and the tubular wall of the third portion of the rivet bore, to a point in the third portion short of the first portion of the bore.

9. A non-blind rivet, adapted to be set by compressive forces, comprising a rivet body having an axis and a tubular wall around an axial bore which extends from a tail end portion to a head end portion of the rivet, a head flange at the head end portion of the rivet extending outwardly from the body, characterized in that the axial bore comprises:

three portions of different diameters;

a first cylindrical portion of the bore at a first diameter extending from the tail end portion;

a second cylindrical portion of the bore at a second diameter less than the first diameter extending from the head end portion;

an intermediate cylindrical portion of the bore extending between the first and second portions thereof at a diameter less than the second diameter; and a surface formed at an inboard end of the second portion of the bore which is generally perpendicular to the axis of the bore and which defines a planar cross section of the tubular body whereat an inboard end of an ultimately deformable section of the tubular body is located.

10. A non-blind rivet, adapted to be set by compressive forces for securance to a workpiece of a first prescribed thickness, comprising a rivet body having a tubular wall around an axial bore which extends from a tail end portion to a head end portion of the rivet, a head flange of a second prescribed thickness at the head end portion of the rivet extending outwardly from the body, characterized in that the axial bore comprises:

at least two portions of different diameters;

a first cylindrical portion of the bore at a first diameter extending axially inward from the tail end portion;

a second cylindrical portion of the bore at a second diameter less than the first diameter extending axially inward from the head end portion;

the head flange formed with an inboard side which is located for engagement with the workpiece upon assembly therewith such that the head flange when assembled with the workpiece will form a combined thickness generally equal to the sum of the first and second prescribed thicknesses;

the second portion of the bore extending a prescribed axial length which is greater than the combined thickness;

a wall section of the tubular body formed adjacent the second portion of the bore extending axially inward the prescribed axial length from an axially outboard end of the second portion and formed with a prescribed wall thickness;

the wall section formed with a first segment extending axially inward from the outboard end of the second portion of the bore for a distance equal to the combined thickness;

the wall section formed with a second segment extending axially inward from, and integrally formed with, the first segment thereof for an axial distance equal to the difference between the prescribed axial length of the second portion of the bore and the combined thickness; and the axial length of the second segment, and the prescribed wall thickness, of the wall section being sufficient to allow the wall section to buckle laterally outward upon the application of opposing axial pressure to the head end portion and the tail end portion.

11. The non-blind rivet as set forth in claim 10, which further comprises:

a surface formed at an inboard end of the second portion of the bore which is generally perpendicular to the axis of the bore and which defines a planar cross section of the tubular body whereat an inboard section is located.

* * * * *